(12) United States Patent
Takuma

(10) Patent No.: US 12,202,465 B2
(45) Date of Patent: Jan. 21, 2025

(54) DRIVE CONTROLLER OF HYBRID VEHICLE, AND DRIVE CONTROLLING METHOD FOR HYBRID VEHICLE

(71) Applicant: HITACHI ASTEMO, LTD., Hitachinaka (JP)

(72) Inventor: Hiroaki Takuma, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 344 days.

(21) Appl. No.: 17/614,906

(22) PCT Filed: May 22, 2020

(86) PCT No.: PCT/JP2020/020234
§ 371 (c)(1),
(2) Date: Nov. 29, 2021

(87) PCT Pub. No.: WO2020/241470
PCT Pub. Date: Dec. 3, 2020

(65) Prior Publication Data
US 2022/0234568 A1    Jul. 28, 2022

(30) Foreign Application Priority Data
May 31, 2019   (JP) .................................. 2019-102825

(51) Int. Cl.
*B60W 20/12*      (2016.01)
*B60W 10/06*      (2006.01)
*B60W 10/08*      (2006.01)

(52) U.S. Cl.
CPC ............ *B60W 20/12* (2016.01); *B60W 10/06* (2013.01); *B60W 10/08* (2013.01);
(Continued)

(58) Field of Classification Search
CPC ...... B60W 20/12; B60W 10/06; B60W 10/08; B60W 2510/087; B60W 2510/244;
(Continued)

(56) References Cited

U.S. PATENT DOCUMENTS

| 2006/0207809 | A1* | 9/2006 | Casey | B60K 6/46 |
| | | | | 180/65.1 |
| 2015/0066270 | A1* | 3/2015 | Ogawa | B60L 53/64 |
| | | | | 701/400 |
| 2020/0346549 | A1* | 11/2020 | Ko | B60L 15/20 |

FOREIGN PATENT DOCUMENTS

| JP | 2010-115053 A | 5/2010 |
| JP | 2016-220271 A | 12/2016 |
| WO | WO-2013/132593 A1 | 9/2013 |

OTHER PUBLICATIONS

International Search Report with English translation and Written Opinion issued in corresponding application No. PCT/JP2020/020234 dated Aug. 25, 2020.

* cited by examiner

*Primary Examiner* — Yi-Kai Wang
(74) *Attorney, Agent, or Firm* — Foley & Lardner LLP

(57) ABSTRACT

A driver controller of a hybrid vehicle driven by using an electric motor and an engine that is an internal combustion engine. The drive controller can include a storage unit, a temperature detection unit, an environment information acquiring unit, a power consumption calculation unit, and a vehicle control unit. The storage unit can include a power consumption rate map and a power consumption difference threshold map. The environment information acquiring unit can refer to the power consumption difference threshold map to determine power consumption difference thresholds. The power consumption calculation unit can refer to the power consumption rate map to calculate power consumption of (Continued)

the electric motor. The power consumption difference threshold can be a criterion for changing a drive ratio of the vehicle.

12 Claims, 6 Drawing Sheets

(52) U.S. Cl.
CPC . *B60W 2510/087* (2013.01); *B60W 2510/244* (2013.01); *B60W 2552/15* (2020.02); *B60W 2710/06* (2013.01); *B60W 2710/083* (2013.01)

(58) Field of Classification Search
CPC ......... B60W 2552/15; B60W 2710/06; B60W 2710/083; B60W 2552/20; B60W 2710/0666; B60W 2710/086; B60W 2710/088; B60W 30/1843; Y02T 10/62; Y02T 10/40; Y02T 10/7072; B60L 15/20; B60L 50/16

See application file for complete search history.

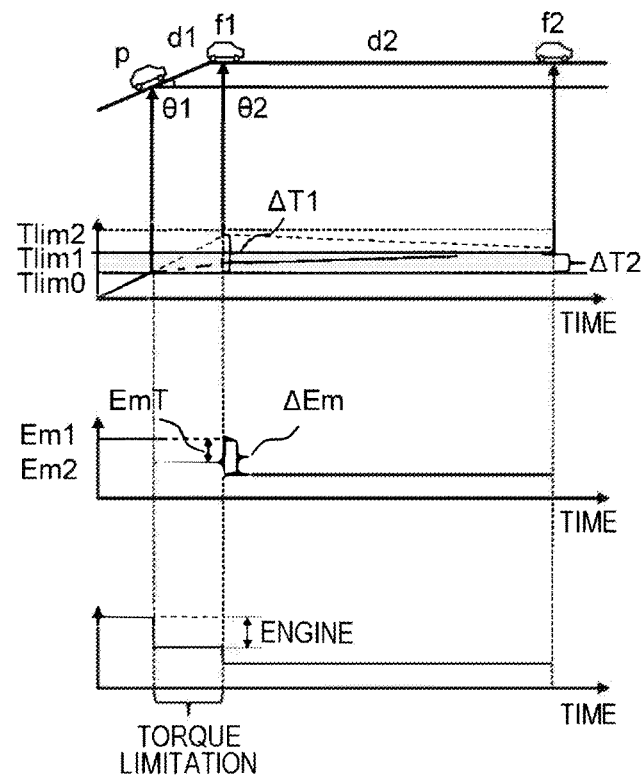
FIG. 5(A) ENVIRONMENT INFORMATION
FIG. 5(B) TEMPERATURE RISE
FIG. 5(C) POWER CONSUMPTION RATE
FIG. 5(D) MOTOR TORQUE

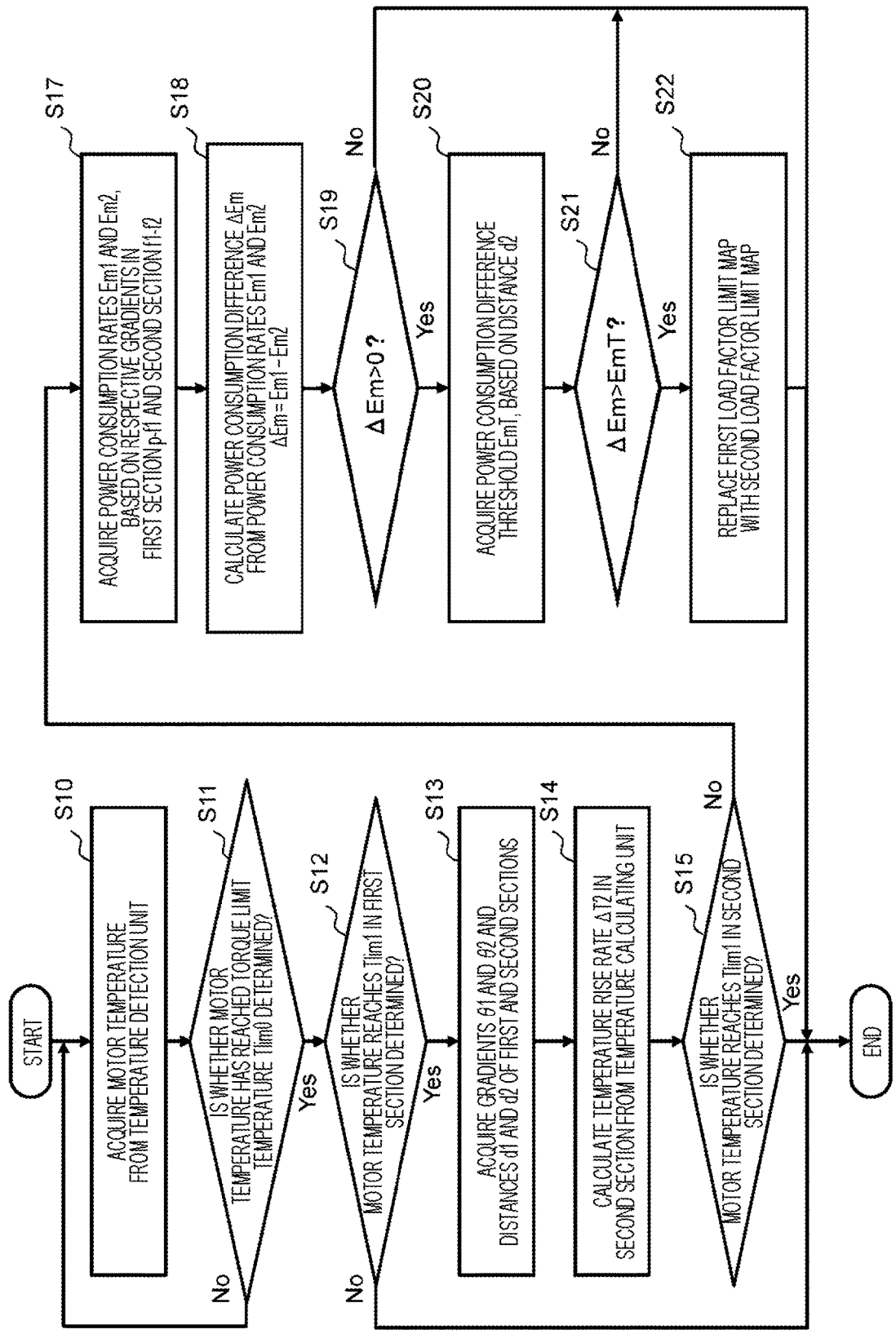

DRIVE CONTROLLER OF HYBRID VEHICLE, AND DRIVE CONTROLLING METHOD FOR HYBRID VEHICLE

TECHNICAL FIELD

The present invention relates to a drive controller of a hybrid vehicle and a drive controlling method for the hybrid vehicle.

BACKGROUND ART

A hybrid vehicle is equipped with an engine that combusts fuel to drive the vehicle and with an electric motor (motor) supplied with power from a battery to drive the vehicle. The motor generates heat during driving due to copper loss, iron loss, or the like, and when the output of the motor increases, the amount of heat generated by the motor also increases. For example, when the vehicle is traveling on a steep slope or the like, the temperature of the motor may rise significantly. The motor's remaining in an overheating state raises a concern that the motor may have a problem. From the viewpoint of component protection, the torque of the motor is limited.

Patent Literature 1 discloses a device that puts limits on the torque of a motor to suppress overheating of the motor when determining that the temperature of the motor reaches an operation-guarantee temperature, and that cancels the limits on the torque to give priority to a gradient-climbing capability when determining that the temperature of the motor does not reach the operation-guarantee temperature and that a rise in the motor temperature is so brief as to be considered harmless from the viewpoint of the durability of the motor.

CITATION LIST

Patent Literature

PLT 1: Japanese Patent Application Laid-Open No. 2010-115053

SUMMARY OF INVENTION

Technical Problem

According to the device described in Patent Literature 1, limiting the torque of the motor to avoid overheating of the motor results in switching to engine-driven traveling, thus leading to lower fuel efficiency, which is a problem.

Solution to Problem

A drive controller of a hybrid vehicle according to the present invention is a drive controller of a hybrid vehicle driven by using an electric motor and an engine that is an internal combustion engine. The drive controller includes: a temperature detection unit that detects a temperature of the electric motor; an environment information acquiring unit that acquires traveling environment information on the vehicle; a power consumption calculation unit that receives, from the environment information acquiring unit, information about a first section that is a path where heat generation by the electric motor is expected and about a second section that is a path where heat generation by the electric motor is less than heat generation by the electric motor in the first section, the power consumption calculation unit calculating power consumption by the electric motor in the first section and in the second section; and a vehicle control unit that controls output torque of the electric motor in the first section, based on the temperature of the electric motor detected by the temperature detection unit and on the power consumption calculated by the power consumption calculation unit, to change a drive ratio of the engine.

A drive controlling method for a hybrid vehicle according to the present invention is a drive controlling method for a hybrid vehicle driven by using an electric motor and an engine that is an internal combustion engine. The drive controlling method includes: detecting a temperature of the electric motor; acquiring traveling environment information on the vehicle; calculating power consumption by the electric motor in a first section and in a second section, the first section being a path where heat generation by the electric motor is expected and the second section being a path where heat generation by the electric motor is less than heat generation by the electric motor in the first section, based on the acquired traveling environment information; and controlling output torque of the electric motor in the first section, based on the detected temperature of the electric motor and on the calculated power consumption, to change a drive ratio of the engine.

Advantageous Effects of Invention

According to the present invention, fuel efficiency can be improved by changing the drive ratio of the engine according to a traveling path.

BRIEF DESCRIPTION OF DRAWINGS

FIGS. 5(A) to 5(D) are diagrams for explaining a state in which the torque of the motor is limited according to traveling of the vehicle.

FIG. 6 is a flowchart describing an operation of a vehicle control unit.

DESCRIPTION OF EMBODIMENTS

Figure 1:
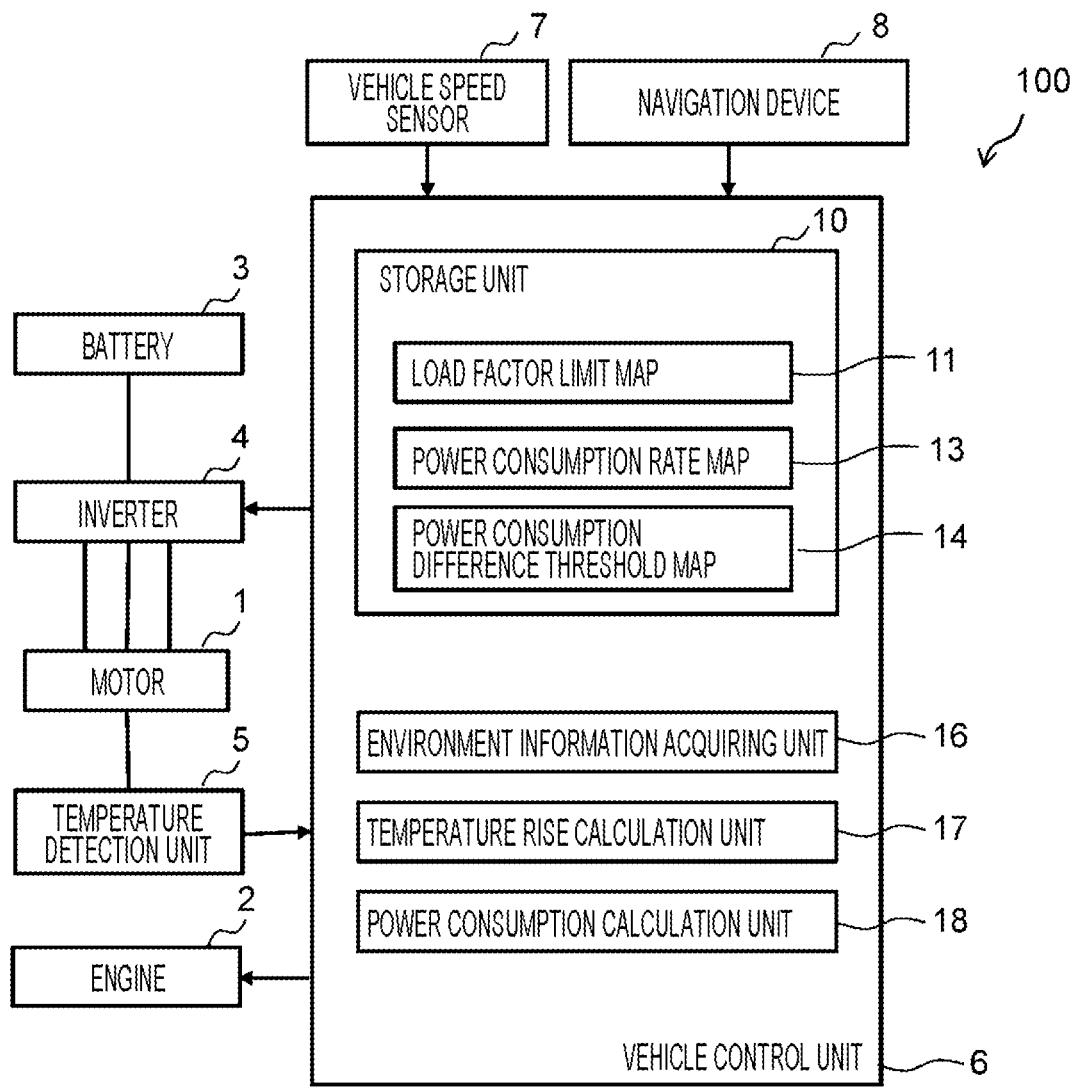
FIG. 1 is a configuration diagram showing a drive controller of a hybrid vehicle.

FIG. 1 is a configuration diagram showing a drive controller 100 of a hybrid vehicle according to an embodiment of the present invention.

The drive controller 100 includes a motor (electric motor) 1, and an engine 2 that is an internal combustion engine that combusts a fuel to drive the vehicle. The drive controller 100 further includes a battery 3 that supplies the motor 1 with power, and an inverter 4 that converts a direct current from the battery 3 into a three-phase alternating current and that supplies the alternating current to the motor 1. Near the motor 1, a temperature detection unit 5, such as a temperature sensor, that detects the temperature of the motor 1 is provided.

A vehicle control unit 6 controls driving of the motor 1 through the inverter 4 and controls driving of the engine 2 as well. The vehicle control unit 6 acquires vehicle speed information from a vehicle speed sensor 7 that detects the speed of the vehicle. In addition, the vehicle control unit 6 acquires road information, such as a gradient of a traveling path, from a navigation device 8.

The vehicle control unit 6 includes a storage unit 10. In the storage unit 10, a load factor limit map 11, a power consumption rate map 13, and a power consumption difference threshold map 14 are stored in advance. The vehicle control unit 6 further includes an environment information acquiring unit 16, a temperature rise calculation unit 17, and a power consumption calculation unit 18. Based on the temperature of the motor 1 detected by the temperature detection unit 5 and on power consumption calculated by the power consumption calculation unit 18, the vehicle control unit 6 controls output torque of the motor 1 on the traveling path, thereby changing a drive ratio of the engine 2.

The load factor limit map 11 stores therein a relationship between the temperature of the motor 1 and a maximum load factor, and has a first load factor limit map and a second load factor limit map in which the torque with respect to the temperature of the motor 1 is limited further than in the first load factor limit map.

The power consumption rate map 13 is a map indicating a relationship between a traveling path, such as a gradient-climbing path on which the vehicle is expected to travel, and a power consumption rate of the motor 1. Details of this map will be described later. A relationship between the traveling path, such as a gradient-climbing path, and the power consumption rate is determined by simulation or the like, and is stored in advance.

The power consumption difference threshold map 14 is a map that defines, in advance, a relationship between a traveling distance in which the vehicle is expected to travel and a power consumption difference threshold EmT. Details of this map will be described later. The relationship between the traveling distance and the power consumption difference threshold EmT is determined by simulation or the like, and is stored in advance.

The environment information acquiring unit 16 acquires traveling environment information from map information or the like in the navigation device 8, the traveling environment information including information on the gradient and the distance of a first section related to the traveling path and information on the gradient and the distance of a second section that follows the first section.

The temperature rise calculation unit 17 determines whether a motor temperature reaches a torque limit temperature, based on the current load of the motor 1. In addition, the temperature rise calculation unit 17 calculates a temperature rise rate of the motor 1 in a traveling section. Temperature rise rates in traveling sections are stored in advance in the storage unit 10 as a map of temperature rise rates, based on data obtained by simulation or the like. The temperature rise calculation unit 17 refers to this map to determine a temperature rise rate in each traveling section.

Referring to the power consumption rate map 13, the power consumption calculation unit 18 determines the power consumption rate of the motor 1, based on the speed of the vehicle and the gradient of the traveling path. Specifically, the power consumption calculation unit 18 calculates power consumption by the motor 1 in the first section and in the second section, based on information about the first section, which is a path where heat generation by the motor 1 is expected, and about the second section, which is a path where heat generation by the motor 1 is less than the same in the first section.

Figure 2:
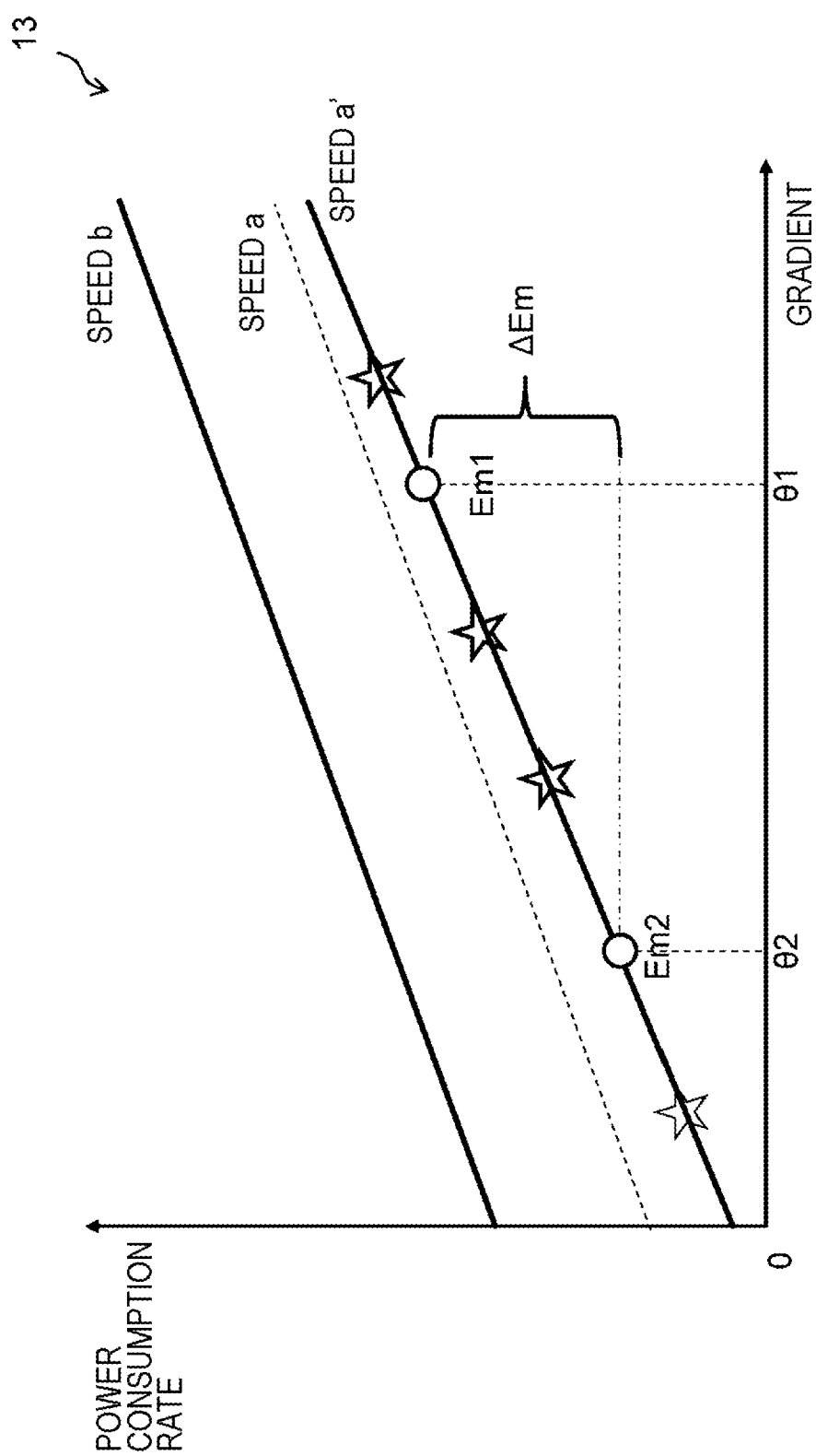
FIG. 2 is a power consumption rate map showing a relationship between a gradient of a road and a power consumption rate of a motor.

FIG. 2 is the power consumption rate map 13 showing a relationship between the gradient of a road on which the vehicle is expected to travel and the power consumption rate of the motor 1. The horizontal axis represents the gradient of the road, and the vertical axis represents the power consumption rate. The power consumption rate map 13 is obtained for speeds a, b, . . . , by simulations or experiments, and is saved as a map plotted against the speeds a, b, . . . . When the speeds a, b, . . . increase, the power consumption rate increases. In addition, when the speed is constant, the power consumption rate increases in proportional to an increase in the gradient of the road.

In accordance with a change in a traveling environment, the power consumption rate map 13 is corrected based on a gradient and a power consumption rate that are saved at the time of actual traveling. Speed a' represents the relationship that is corrected based on actual traveling data, indicating that a power consumption rate Em2 results when the gradient is θ2 and that a power consumption rate Em1 results when the gradient is θ1 larger than the gradient θ2.

A case is assumed where the vehicle travels on a gradient-climbing path with the gradient θ1 and then travels on a traveling path with the gradient θ2 smaller than the gradient θ1. The vehicle control unit 6 acquires the power consumption rate Em1 by referring to the power consumption rate map 13, based on the road gradient θ1 and the speed a' that the environment information acquiring unit 16 has acquired from the navigation device 8 and the vehicle speed sensor 7, respectively. The vehicle control unit 6 acquires also the power consumption rate Em2 that results after gradient climbing, by referring to the power consumption rate map 13, based on the road gradient θ2 and the speed a' that the environment information acquiring unit 16 has acquired from the navigation device 8 and the vehicle speed sensor 7, respectively. A power consumption difference representing a difference between a power consumption rate in the gradient-climbing path with the gradient θ1 and the same in the traveling path with the gradient θ2 is ΔEm.

Figure 3:
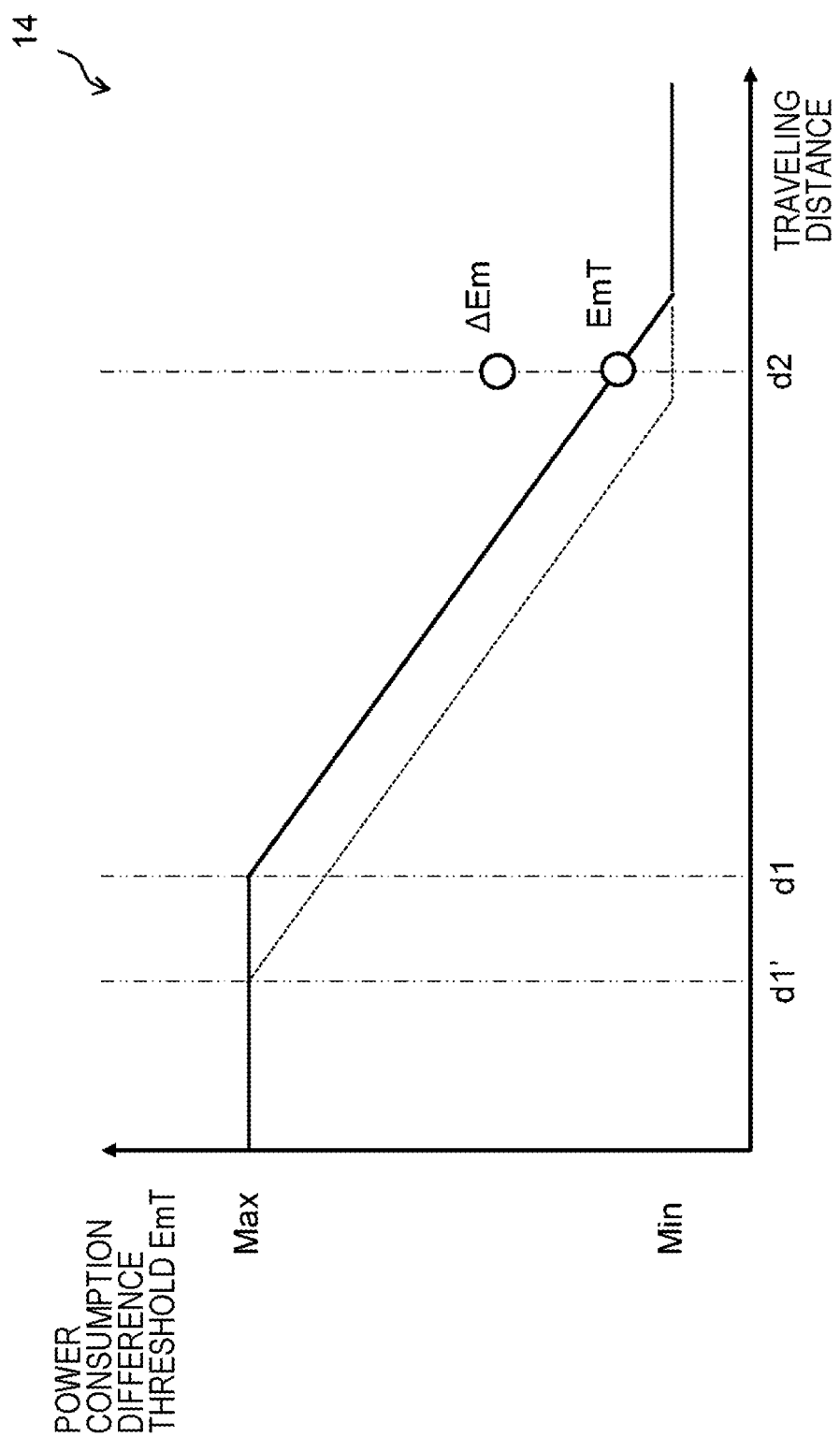
FIG. 3 shows a power consumption difference threshold map that defines, in advance, a relationship between a traveling distance and a power consumption difference threshold.

FIG. 3 shows a power consumption difference threshold map 14 that defines, in advance, a relationship between a traveling distance in which the vehicle is expected to travel and a power consumption difference threshold EmT. The horizontal axis represents the traveling distance, and the vertical axis represents the power consumption difference threshold EmT.

It is assumed that the gradient-climbing path with the gradient θ1 has a traveling distance d1 while the traveling path with the gradient θ2 has a traveling distance d2. As indicated in FIG. 3, the power consumption difference threshold EmT remains Max up to the point of the traveling distance d1 of the gradient-climbing path, and then decreases as it approaches to the point of the traveling distance d2 of the traveling path. When it is assumed that the gradient-climbing path has a traveling distance d1', the power consumption difference threshold EmT remains Max up to the point of the traveling distance d1' of the gradient-climbing path, as indicated by a dotted line in FIG. 3.

Based on the traveling distance d1 of the gradient-climbing path with the gradient θ1 and the traveling distance d2 of the traveling path with the gradient θ2, the traveling distances d1 and d2 being acquired by the environment information acquiring unit 16 from the navigation device 8, the vehicle control unit 6 refers to the power consumption difference threshold map 14 and determines power consumption difference thresholds EmT for the traveling distances d1 and d2, respectively.

Even when the traveling distance d2 of the traveling path that follows the gradient-climbing path is long and the power consumption difference threshold EmT is small in the traveling path, if the power consumption difference ΔEm representing the difference between the power consumption rate in the path with the gradient θ1 and the same in the path with the gradient θ2 is found larger than the power consumption difference threshold EmT, it is concluded that a fuel efficiency improvement effect is high. It should be noted that the power consumption difference threshold map 14 is a map created by implementing a simulation or experiment on each motor 1 and storing a relationship between the traveling distance and the power consumption difference threshold EmT in advance.

Figure 4:
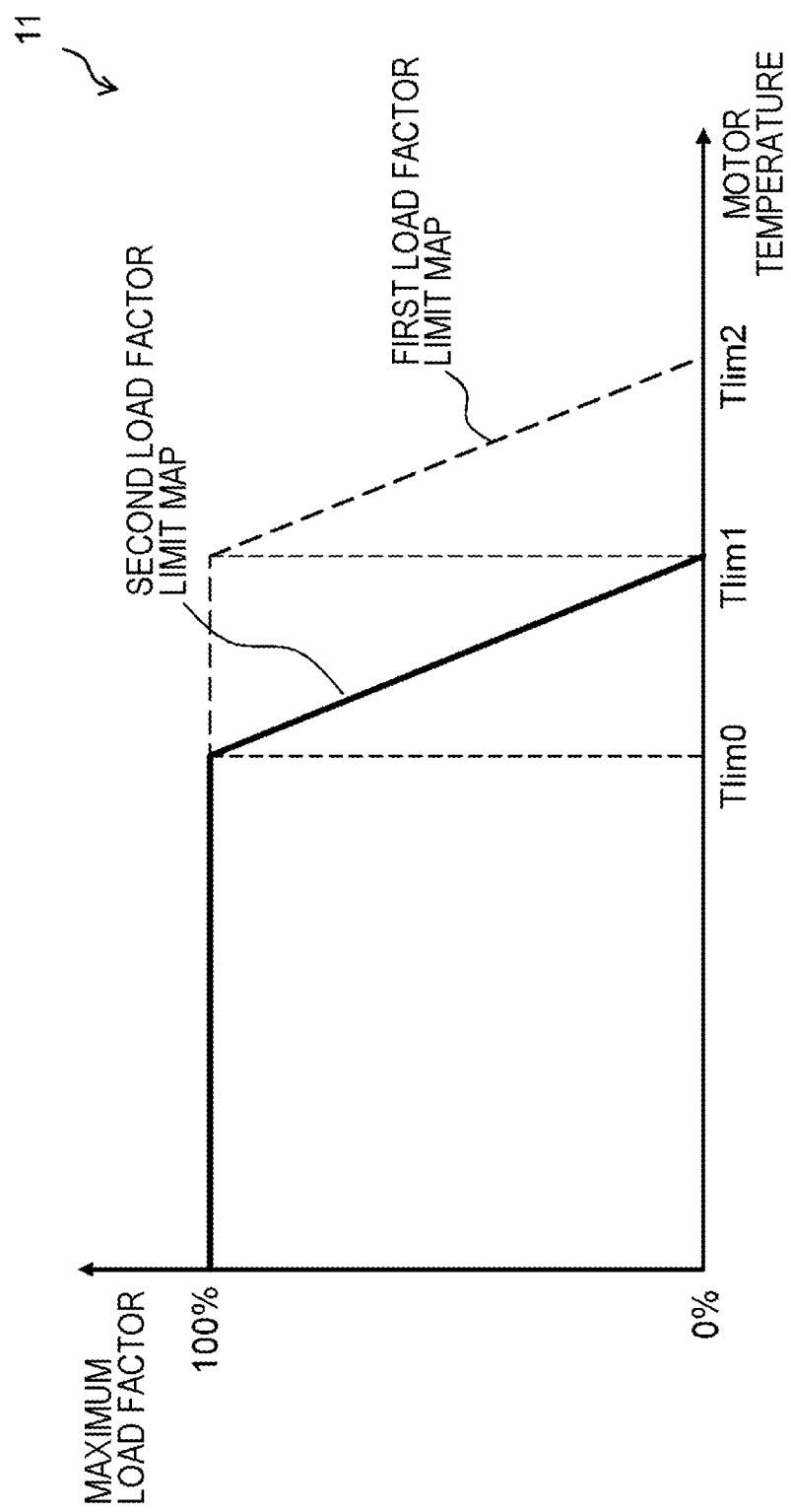
FIG. 4 is a graph showing a load factor limit map.

FIG. 4 is a graph showing the load factor limit map 11. The horizontal axis represents the temperature of the motor 1, and the vertical axis represents a maximum load factor.

A first load factor limit map is a map that defines a maximum load factor that varies depending on the temperature of the motor 1, and is indicated by a dotted line in FIG. 4. The first load factor limit map indicates that the maximum load factor remains constant (100%) until reaching the point of a torque limit temperature Tlim1, decreases with a rise in the motor temperature in a temperature range equal to or higher than the torque limit temperature Tlim1, and reduces to 0% at the point of a torque cut-off temperature Tlim2.

A second load factor limit map is indicated by a continuous line in FIG. 4. The second load factor limit map indicates that the maximum load factor remains constant (100%) until reaching the point of a torque limit temperature Tlim0, decreases with a rise in the motor temperature in a temperature range equal to or higher than the torque limit temperature Tlim0, and reduces to 0% at the point of a torque cut-off temperature Tlim1. The second load factor limit map is a map that defines a load factor limit value in a temperature range where driving of the motor 1 is guaranteed, e.g., a temperature range equal to or lower the torque cut-off temperature Tlim1.

The load factor limit map 11 is a map that is created by implementing a simulation or experiment so that torque limitation can be carried out within a range in which improved fuel efficiency is expected for each motor 1. This is because that a time to reach the torque cut-off temperature varies depending on the size and heat dissipation characteristics of the motor.

FIGS. 5(A) to 5(D) are diagrams for explaining a state in which the torque of the motor 1 is limited according to traveling of the vehicle.

FIG. 5(A) shows environment information the environment information acquiring unit 16 has acquired from the navigation device 8. In the following description, the gradient-climbing path with the gradient θ1 and the traveling distance d1 will be referred to as the first section, and the traveling path with the gradient θ2 and the traveling distance d2 will be referred to as the second section. The first section is the path where heat generation by the motor 1 is expected, and the second section is the path where heat generation by the motor 1 is less than the same in the first section. At a start point p of a first section p-f1, the environment information acquiring unit 16 acquires, from the navigation device 8, information on the gradient θ1 of the first section p-f1 and the traveling distance d2 and the gradient θ2 of a second section f1-f2 that follows the first section.

FIG. 5(B) shows a temperature rise calculated by the temperature rise calculation unit 17. When the temperature detection unit 5 detects the motor temperature having reached the given temperature Tlim0 as the vehicle is traveling past the start point p of the first section p-f1, the temperature rise calculation unit 17 calculates a temperature rise rate ΔT1 in the first section p-f1. When it is expected that the motor temperature rises to reach the torque limit temperature Tlim1 in the first section p-f1, the temperature rise calculation unit 17 calculates a temperature rise rate ΔT2 in the second section f1-f2, based on the acquired environment information, and determines whether the motor temperature reaches Tlim1 by the temperature rise rate ΔT2. Respective temperature rise rates in the first section p-f1 and the second section f1-f2 are stored in advance in the storage unit 10, as a map of temperature rise rates, which have been obtained in advance from actual cases of the traveling vehicle. Referring to this map, the temperature rise calculation unit 17 determines a temperature rise rate corresponding to a traveling path.

FIG. 5(C) shows power consumption calculated by the power consumption calculation unit 18. When the temperature rise calculation unit 17 determines that the motor temperature does not reach the torque limit temperature threshold Tlim1 in the second section f1-f2, the power consumption calculation unit 18 compares the power consumption rate Em1 in the first section p-f1 with the power consumption rate Em2 in the second section f1-f2. When comparing the difference ΔEm between the power consumption rates Em1 and Em2 with the threshold EmT, which is a criterion for determining whether the power consumption rate calculated by using the distances of the first and second sections is improved, and finding ΔEm to be larger, the power consumption calculation unit 18 determines to be a section that offers a fuel efficiency improvement effect.

FIG. 5(D) shows the torque of the motor 1. When finding that the difference ΔEm between the power consumption rates is larger than the threshold EmT calculated by using the section distances d1 and d2, the power consumption calculation unit 18 sets a temperature threshold for torque limitation on the motor 1 to a low value so as to prevent the motor 1 from overheating. In other words, when the fuel efficiency improvement effect in the second section is large, the torque in the first section is limited. As a result, the motor 1 is limited in its torque in the first section p-f1, which makes the first section p-f1 a hybrid traveling section where the vehicle is driven by the motor 1 and the engine 2. Meanwhile, the second section f1-f2 is a traveling section where the vehicle is driven by the motor 1 only. In this manner, overheating of the motor is suppressed in the gradient-climbing traveling section as stable motor-driven traveling is performed in the section that follows the gradient-climbing traveling section and that offers a high fuel efficiency improvement effect. This improves the fuel efficiency.

FIG. 6 is a flowchart describing an operation of the vehicle control unit 6.

At step S10 of FIG. 6, the current temperature of the motor 1 is acquired from the temperature detection unit 5. Then, at step S11, whether the motor temperature has reached the torque limit temperature Tlim0 is determined, based on the acquired temperature information on the motor 1, when the vehicle is traveling past the start point p of the first section p-f1. When the motor temperature has not reached the torque limit temperature Tlim0, the vehicle control unit 6 returns to step S10. When the motor temperature has reached the torque limit temperature Tlim0, the vehicle control unit 6 proceeds to step S12.

At step S12, the temperature rise calculation unit 17 determines whether the motor temperature reaches the torque limit temperature Tlim1 in the first section p-f1, based on the current load of the motor 1. When it is determined at step S12 that the motor temperature does not reach the torque limit temperature Tlim1, the vehicle control unit 6 ends steps of this flowchart. When it is determined that the motor temperature reaches the torque limit temperature Tlim1, the vehicle control unit 6 proceeds to step S13.

At step S13, the environment information acquiring unit 16 acquires, from map information or the like in the navigation device 8, information on the gradient θ1 and the distance d1 of the first section related to the traveling path and information on the gradient θ2 and the distance d2 of the second section that follows the first section.

At step S14, the temperature rise calculation unit 17 calculates a temperature rise rate ΔT2 of the motor 1 in the second section. At step S15, based on the temperature rise rate ΔT2 in the second section calculated by the temperature rise calculation unit 17, whether the motor temperature reaches the torque limit temperature Tlim1 when motor-driven traveling is performed in the second section is determined. When it is determined that the motor temperature reaches the torque limit temperature Tlim1, the vehicle control unit 6 ends the steps of this flowchart. When it is determined that the motor temperature does not reach the torque limit temperature Tlim1, the vehicle control unit 6 proceeds to processes of step S17 and other steps to follow, thus carrying out torque limit temperature change control.

At step S17, with reference to the power consumption rate map 13, the power consumption rate Em1 in the first section p-f1 and the power consumption rate Em2 in the second section f1-f2 are calculated, based on the gradient θ1 of the first section p-f1 and the gradient θ2 of the second section f1-f2 that are acquired by the environment information acquiring unit 15.

At step S18, the power consumption difference ΔEm representing a difference between power consumption rates is calculated from the power consumption rate Em1 in the first section p-f1 and the power consumption rate Em2 in the second section f1-f2. At step S19, whether the power consumption difference ΔEm representing a difference between power consumption rates is larger than 0, that is, whether the power consumption rate is improved is determined. When it is determined that the power consumption rate is not improved, the vehicle control unit 6 ends the steps of this flowchart. When it is determined that the power consumption rate is improved, the vehicle control unit 6 proceeds to a process of step S20. At step S20, with reference to the power consumption difference threshold map 14, the power consumption difference threshold EmT is acquired, based on the distance d2 of the second section.

At step S21, whether the power consumption difference ΔEm representing a difference between power consumption rates is larger than the power consumption difference threshold EmT is determined. A case of the power consumption difference ΔEm representing a difference between power consumption rates being larger than the power consumption difference threshold EmT is a case where the vehicle's traveling by the motor 1 in the second section offers a fuel efficiency improvement effect, in which case the vehicle control unit 6 proceeds to step S22. When it is determined at step S21 that the power consumption difference ΔEm representing a difference between power consumption rates is not larger than the power consumption difference threshold EmT, the vehicle control unit 6 ends the steps of this flowchart.

At step S22, the load factor limit map 11 is switched, that is, the first load factor limit map is replaced with the second load factor limit map.

Based on the fact that the load factor limit map 11 is switched to the second load factor limit map at the start point p of the first section p-f1, the vehicle control unit 6 limits the torque in the first section. In other words, the vehicle control unit 6 controls the output torque of the motor 1 in the first section to change a drive ratio of the engine 2. As a result, the motor 1 is limited in its torque in the first section p-f1, which makes the first section p-f1 a hybrid traveling section where the vehicle is driven by the motor 1 and the engine 2. Meanwhile, the second section f1-f2 is a traveling section where the vehicle is driven by the motor 1 only. It should be noted that the output torque of the motor 1 in the second section f1-f2 may be controlled to lower the drive ratio of the engine 2.

In this manner, respective power consumption rates in the first section and the second section are compared with each other, and the vehicle is caused to travel on the engine 2 and the motor 1 in the first section where the fuel efficiency improvement effect is large. In this case, overheating of the motor 1 is suppressed, which improves fuel efficiency. On the other hand, the engine 2 is driven with high efficiency, which reduces gas emission. Specifically, when overheating of the motor 1 is expected in the first section where the power consumption rate is low, the torque of the motor 1 is limited in the first section while traveling by the motor 1 is performed for a long time in the second section where the power consumption rate is high. This achieves a higher fuel efficiency improvement effect.

The embodiment described above offers the following effects.

(1) The drive controller 100 of the hybrid vehicle includes: the motor 1 that drives the vehicle, the engine 2 that drives the vehicle by combusting a fuel, the temperature detection unit 5 that detects a temperature of the motor 1; the environment information acquiring unit 16 that acquires traveling environment information on the vehicle; the power consumption calculation unit 18 that receives, from the environment information acquiring unit 16, information about the first section that is a path where heat generation by the motor 1 is expected and about the second section that is a path where heat generation by the motor 1 is less than heat generation by the motor 1 in the first section, the power consumption calculation unit 18 calculating power consumption by the motor 1 in the first section and in the second section; and the vehicle control unit 6 that controls the output torque of the motor 1 in the first section, based on the temperature of the motor 1 detected by the temperature detection unit 5 and on the power consumption calculated by the power consumption calculation unit 18, to change the drive ratio of the engine 2. According to this configuration, the drive ratio of the engine is changed according to a traveling path, which improves the fuel efficiency.

(2) A drive controlling method for the hybrid vehicle includes: detecting a temperature of the motor 1; acquiring traveling environment information on the vehicle; receiving information about the first section that is a path where heat generation by the motor 1 is expected and about the second section that is a path where heat generation by the motor 1 is less than heat generation by the motor 1 in the first section and calculating power consumption by the motor 1 in the first section and in the second section, based on the acquired traveling environment information; and controlling the output torque of the motor 1 in the first section, based on the detected temperature of the motor 1 and on the calculated power consumption, to change the drive ratio of the engine 2. According to this configuration, the drive ratio of the engine is changed according to a traveling path, which improves the fuel efficiency.

(Modification) According to the present invention, the embodiment described above can be modified and implemented in the following manner.

(1) In the embodiment, the first section, which is the gradient-climbing path with the first gradient, and the second section, which is the traveling path with the second gradient smaller than the first gradient, have been described exemplarily. However, the first section is not always a gradient-climbing path. If the first section is a traveling path where heat generation by the motor is expected to be greater than heat generation in the second section, the embodiment can also be applied to such a traveling path. For example, an acceleration section joining an expressway may be considered to be the first section, and a traveling section of the expressway may be considered to be the second section.

The present invention is not limited to the above embodiment, and other embodiments that can be conceived within a technical concept provided by the invention are also included in the scope of the present invention, providing that such embodiments do not impair the features of the present invention. A combination of the above-described embodiment and a plurality of modifications may also constitute the present invention.

REFERENCE SIGNS LIST 1 motor
2 engine
3 battery
4 Inverter
5 temperature detection unit
6 vehicle control unit
7 vehicle speed sensor
8 navigation device
10 storage unit
11 load factor limit map
13 power consumption rate map
14 power consumption difference threshold map
16 environment information acquiring unit
17 temperature rise calculation unit
18 power consumption calculation unit
100 drive controller

The invention claimed is:

1. A drive controller of a hybrid vehicle driven by using an electric motor and an engine that is an internal combustion engine, the drive controller comprising:
a storage unit, the storage unit comprising:
a power consumption rate map, the power consumption rate map, determined by a simulation and stored in advance, storing a relationship between a gradient of a path and speed of the vehicle and a power consumption rate of the electric motor;
a power consumption difference threshold map, the power consumption difference threshold map, determined by a simulation and stored in advance, storing a relationship between a traveling distance the vehicle is expected to travel and a power consumption difference threshold;
a temperature detection unit that detects a temperature of the electric motor;
an environment information acquiring unit that acquires traveling environment information on the vehicle, the environment information acquiring unit determining power consumption difference thresholds by referring to the power consumption difference threshold map and on the traveling environment information including a first traveling distance, a first gradient of a first section of the path, a second traveling distance, and a second gradient of a second section of the path;
a power consumption calculation unit that receives, from the environment information acquiring unit, information about a first section that is a path where heat generation by the electric motor is expected and about a second section that is a path where heat generation by the electric motor is less than heat generation by the electric motor in the first section, the power consumption calculation unit calculating power consumption by the electric motor in the first section and in the second section by referring to the power consumption rate map, on the speed of the vehicle, and a gradient of the first section and the second section; and
a vehicle control unit that controls output torque of the electric motor in the first section, based on the temperature of the electric motor detected by the temperature detection unit and on the power consumption calculated by the power consumption calculation unit, to change a drive ratio of the engine;
wherein the power consumption calculation unit compares a difference of a power consumption rate of the first section and a power consumption rate of the second section with the power consumption difference threshold, the power consumption difference threshold being a criterion for changing the drive ratio of the engine.

2. The drive controller of the hybrid vehicle according to claim 1, wherein when the power consumption in the first section exceeds the power consumption in the second section, the vehicle control unit controls output torque of the electric motor in the first section to change the drive ratio of the engine.

3. The drive controller of the hybrid vehicle according to claim 1, comprising a temperature rise calculation unit that makes a determination on a temperature rise of the electric motor in the first section and in the second section, based on a temperature of the electric motor, the temperature being detected by the temperature detection unit,
wherein when the temperature rise calculation unit determines that the temperature rise of the electric motor in the first section causes a motor temperature to reach a given value while the temperature rise of the electric motor in the second section does not causes the motor temperature to reach the given value, the vehicle control unit controls output torque of the electric motor in the first section, based on the power consumption calculated by the power consumption calculation unit, to change the drive ratio of the engine.

4. The drive controller of the hybrid vehicle according to claim 1, wherein the power consumption calculation unit receives information about the first section that is a gradient-climbing path with a first gradient and about the second section that is a traveling path with a second gradient smaller than the first gradient.

5. The drive controller of the hybrid vehicle according to claim 1, wherein the vehicle control unit controls output torque of the electric motor in the first section to increase the drive ratio of the engine.

6. The drive controller of the hybrid vehicle according to claim 5, wherein the vehicle control unit controls output torque of the electric motor in the second section to reduce the drive ratio of the engine.

7. A drive controlling method for a hybrid vehicle driven by using an electric motor and an engine that is an internal combustion engine; the method comprising:
   detecting a temperature of the electric motor;
   acquiring traveling environment information on the vehicle;
   determining a power consumption threshold, the power consumption threshold determined by the traveling environment information and a power consumption threshold map;
   calculating power consumption by the electric motor in a first section and in a second section, the first section being a path where heat generation by the electric motor is expected and the second section being a path where heat generation by the electric motor is less than heat generation by the electric motor in the first section, based on the acquired traveling environment information;
   comparing, a difference of the power consumption in the first section and the second section to the power consumption threshold; and
   controlling output torque of the electric motor in the first section, based on the detected temperature of the electric motor and on the difference of the power consumption in the first section and the second section exceeding the power consumption threshold, to change a drive ratio of the engine.

8. The drive controlling method for the hybrid vehicle according to claim 7, wherein when the power consumption in the first section exceeds the power consumption in the second section, output torque of the electric motor in the first section is controlled to change a drive ratio of the engine.

9. The drive controlling method for the hybrid vehicle according to claim 7, the method comprising:
   making a determination on a temperature rise of the electric motor in the first section and in the second section, based on the detected temperature of the electric motor; and
   controlling output torque of the electric motor in the first section, based on the calculated power consumption, to change the drive ratio of the engine when it is determined that a temperature rise of the electric motor in the first section causes a motor temperature to reach a given value while a temperature rise of the electric motor in the second section does not cause the motor temperature to reach the given value.

10. The drive controlling method for the hybrid vehicle according to claim 7, wherein a drive ratio of the electric motor and the drive ratio of the engine are changed, based on information about the first section that is a gradient-climbing path with a first gradient and about the second section that is a path with a second gradient smaller than the first gradient.

11. The drive controlling method for the hybrid vehicle according to claim 7, wherein output torque of the electric motor in the first section is controlled to increase the drive ratio of the engine.

12. The drive controlling method for the hybrid vehicle according to claim 11, wherein output torque of the electric motor in the second section is controlled to reduce the drive ratio of the engine.

* * * * *